United States Patent Office 2,897,884
Patented Aug. 4, 1959

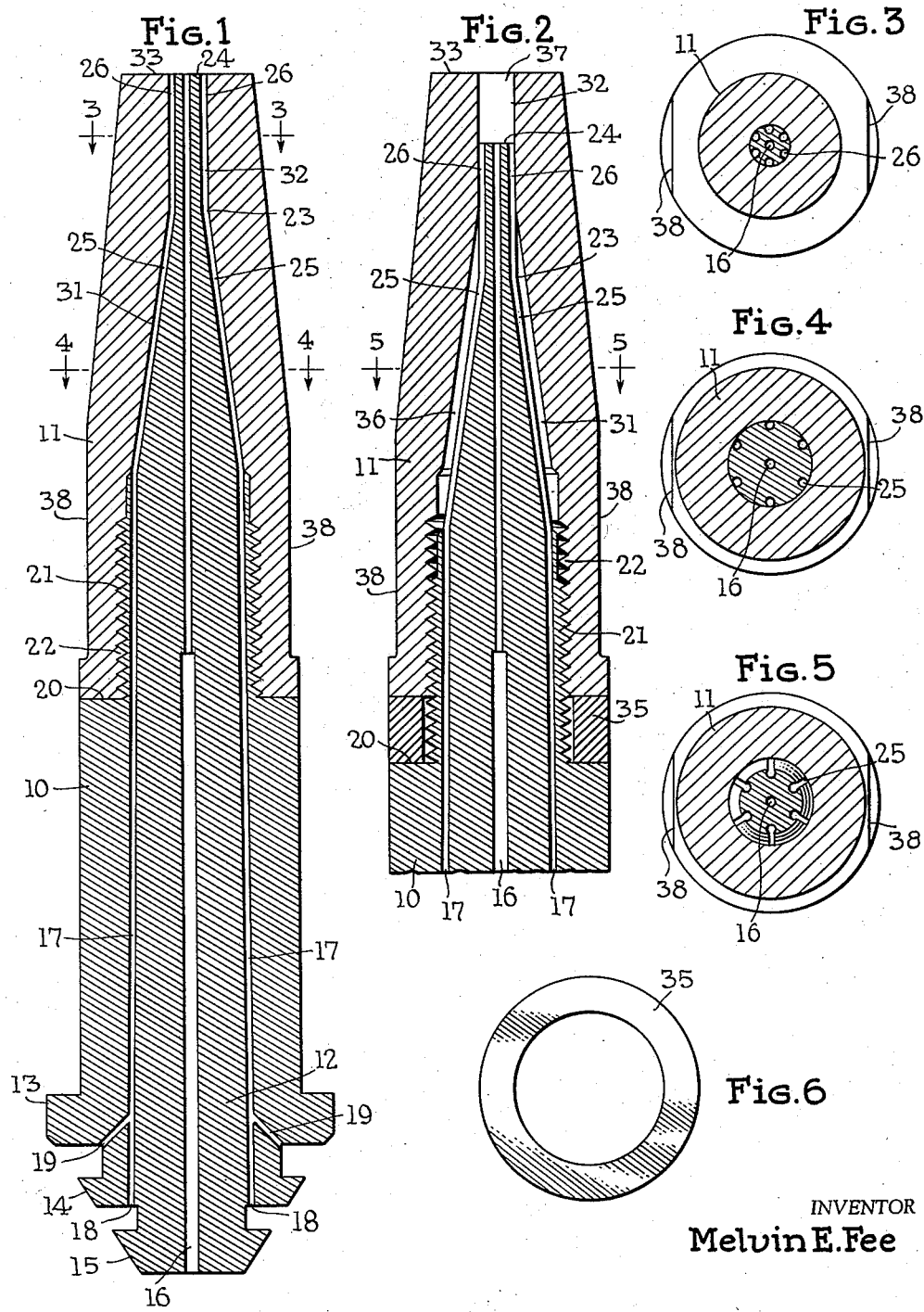

2,897,884
CUTTING TORCH TIP CONSTRUCTION
Melvin E. Fee, Honolulu, Territory of Hawaii
Continuation of application Serial No. 313,547, October 7, 1952. This application January 13, 1958, Serial No. 708,482

2 Claims. (Cl. 158—27.4)

This invention relates to cutting torches used in the flame cutting and burning of metals, and relates more particularly to a new and useful torch tip construction easily convertible for operation with oxygen-acetylene, oxygen-butane, oxygen-propane, and/or other oxygen-natural gas mixtures used in cutting metals.

This application is a continuation of my co-pending application Serial No. 313,547, filed October 7, 1952 now abandoned.

Cutting torches generally include a burner tip for burning a mixture of combustible gas and oxygen, and also include an aperture for discharging a stream of oxidizing gas, such as oxygen, to promote burning of the metal to be cut. It is known to provide the burner tip or nozzle with a central port or aperture for the combustion-supporting oxygen, and to provide a ring of outlet ports surrounding the central port and discharging a combustible mixture of gases. The jets of combustible gases, when ignited, produce flames for preheating the work to be cut at a starting point, and after said preheating, cutting oxygen is applied through the central port to start and maintain the actual burning away of the metal. The burning of the combustible gas mixture continues to preheat the work locally as the cutting torch is moved along to direct the central oxygen jet over a path to be cut by burning. The outlet ports of such cutting torches must be accurately dimensioned to provide uniform preheating flames unaffected by the cutting oxygen or the combustion of the metal cut. The combustible gases delivered to the outlet ports of the cutting torch must be properly mixed and of uniform composition to result in satisfactory preheating and cutting. The nature and size of the mixing means for providing a proper combustible mixture of gases depends on the particular gases used. It has been known to provide one cutting torch for burning an oxygen-acetylene mixture and a different torch for burning an oxygen-butane mixture. Because of the difference in cost between acetylene and butane or other natural gases, it has been found desirable to make some types of cuts with one gas mixture and other types of cuts with other gas mixtures.

The present invention has for its object the provision of a novel cutting torch tip construction quickly and easily convertible for use with oxygen-acetylene, oxygen-butane, oxygen-propane, or other oxygen-natural gas combustible mixtures at will.

It is another object of this invention to provide a cutting torch nozzle construction having a simple nozzle providing for adequate and accurate mixing of the components of the gas mixture, said nozzle being readily modified for operation with each of a variety of gas mixture components.

It is another object of this invention to provide a cutting torch nozzle adapted for both underwater and above water flame cutting using oxygen-natural gas combustible mixtures, and not requiring a separate air jet during underwater metal cutting operations.

It is another object of this invention to provide an oxygen-acetylene cutting torch tip easily converted to an oxygen-butane cutting torch tip by addition of an accurately dimensioned spacer element between parts of the tip assembly.

It is another object of this invention to provide a cutting torch tip assembly including a tapered brass tip and a tapered copper sleeve, together with a removable spacing element therebetween to permit variation of the mixing chamber space between said tip and said sleeve.

Other objects and advantages of this invention will be readily apparent from the following detailed description of a preferred embodiment of the invention illustrated in the accompanying drawings, wherein:

Figure 1 is an enlarged sectional view of a cutting torch nozzle for cutting with an oxygen-acetylene combustible gas mixture.

Figure 2 is an enlarged sectional view of the cutting torch nozzle of Figure 1 modified for cutting with an oxygen-butane combustible gas mixture.

Figure 3 is a sectional view taken on line 3—3 of Figure 1.

Figure 4 is a sectional view taken on line 4—4 of Figure 1.

Figure 5 is a sectional view taken on line 5—5 of Figure 2.

Figure 6 is a plan view of the spacing element shown in the Figure 2 construction.

Referring to Figure 1 of the drawing, for purposes of illustration, the cutting torch nozzle comprises a brass tip 10 and a copper alloy sleeve 11. The rearward portion 12 of the tip 10 is provided with shoulders 13, 14 and 15, for connection in and to a conventional torch head. The tip 10 is provided with a central longitudinal passage 16 through which oxygen is directed to the combustion zone. The tip 10 is also provided with a series of passages 17 having inlets 18 for oxygen, and having branch inlets 19 for a gas such as acetylene, butane, propane, or the like. It is to be understood that the passages 17 are arranged in a series concentric with the longitudinal axis of the tip 10, and preferably there are six passages 17. The tip 10 is provided with a shoulder 20 and a threaded portion 21 for engagement with the threaded portion 22 of sleeve 11. The tip 10 is tapered from the outer end of threaded portion 21 to a point 23, and is then cylindrical from point 23 to the outer end 24 of the tip 10. The passages 17 in the tip 10 extend out through the surface of the tip at points adjacent the end of threads 21 and continue as surface grooves 25 along the surface of the tapered portion and as surface grooves 26 along the surface of the cylindrical portion 23—24 of the tip 10. The surface grooves 25 and 26 are shown in cross-section in Figures 3, 4, and 5. The sleeve 11 is provided with threads 22 to engage the threads 21 of the tip 10, and has a tapered bore 31 and a cylindrical bore 32 complementary to the tapered and cylindrical surface portions of the tip 10. As shown in Figure 1, when the sleeve 11 is turned up fully on the threads 21 so that the inner end of sleeve 11 engages the shoulder 20, then the outer end 33 of the sleeve is in the same plane as the outer end 24 of the tip 10. In said position, the tapered inner surface 31 of the sleeve 11 engages the tapered outer surface of the tip closing over the grooves 25, and the cylindrical inner surface of bore 32 engages the outer surface of the cylindrical portion 23—24 of the tip 10 closing over the grooves 26. In this position of the tip and sleeve, the grooves 25 and 26 become a series of six independent passages extending the passages 17 clear to the outer end 24 of the tip 10.

By way of specific example, the torch tip illustrated may have the following dimensions: Sleeve 11 is made of copper and is one and three quarters inch long, nineteen-thirty-seconds inch diameter at the large end and three-eighths inch diameter at the outer end. The threads 21 are seven-sixteenths inch diameter, twenty threads to the inch, and extend for a longitudinal distance of one-half inch. The tapered bore 31 has a diameter of .298 inch adjacent the end of thread 22, and has a diameter of .219 inch at point 23, the cylindrical bore 32 also being .219 inch diameter and three-eighths inch in length. The tip 10 is made of brass and dimensioned to contact the inner surface of the sleeve 11 when the sleeve 11 is turned up against the shoulder 20 of the tip 10. The central passage 16 of the tip 10 is .055 inch diameter from end 24 to the vicinity of threads 22, and is .11 inch diameter from the thread area to the coupling end 15. The six grooves 25 and 26 when closed by contact with sleeve 11 form passages each about .037 inch diameter.

The torch tip construction shown in Figures 1, 3 and 4, and described above is for cutting operations using an oxygen-acetylene combustible mixture. The oxygen-acetylene mixture is formed by feeding oxygen through inlets 18 and acetylene through inlets 19 in proper proportions to produce a combustible mixture. This mixture is ignited as it issues from the six passages 26 at the outer end 24 of the tip 10. When the flame produced has heated the metal to be cut to its ignition temperature, the flow of oxygen through central passage 16 is initiated and maintained in sufficient volume to support combustion of the metal being cut.

It is found that oxygen-butane, oxygen-propane, and other gas mixtures provide a combustible gas for cutting torches which is highly satisfactory in operation, and which is more economical than the use of oxygen-acetylene mixtures. In order for the torch tip described above to operate on an oxygen-butane gas mixture, it is converted as illustrated in Figures 2 and 5. The torch tip construction shown in Figure 2 is identical with that shown in Figure 1, except that a spacing element 35 is added to space the copper sleeve 11 outward a specific distance from the shoulder 20 of the brass tip 10. For operating the cutting torch with an oxygen-butane mixture, a spacing element or ring 35 about three-sixteenths inch in thickness is provided. It is found that this amount of spacing provides an annular tapered mixing chamber 36 between the tapered portion of the tip 10 and the tapered bore of the sleeve 11. The annular mixing chamber is necessary to provide for correct mixing of the oxygen and butane before the mixture reaches the outer end of the torch for ignition. The insertion of the spacer 35 also draws the end 24 of the tip 10 within the bore 32 of the sleeve 11, providing a combustion chamber 37 in the outer end of the sleeve 11. The longitudinal length of the chamber 37 is the same as the thickness of the spacer 35, namely, three-sixteenths inch for oxygen-butane operation. The annular tapered mixing chamber 36 provides for complete mixing of the oxygen and butane gases, provides for properly preheating the combustible mixture, and provides for delivery of a uniform combustible mixture through each of the six grooves 26 into the space 37. The provision of space 37 is necessary in an oxygen-butane burner, but not necessary in an oxygen-acetylene burner.

The sleeve 11 may be provided with opposite flat areas 38 on its outer surface to receive a wrench for screwing and unscrewing the sleeve 11 on the tip 10. Thus it becomes a simple operation to change the burner tip in the field from oxygen-acetylene operation to oxygen-butane, oxygen-propane, or oxygen-other gas operation. The operator merely removes the sleeve 11 and places the proper spacer ring on the tip 10 and replaces the sleeve 11.

It has been found that the torch tip assembled with spacer 35 as illustrated in Figure 2 will operate successfully under water to a depth of at least ten inches without any change in the tip from that as used above water. The provision of the annular mixing chamber 36 protects the tip 10 from excessive cooling when used under water, and hence prevents the flame from being extinguished. Underwater operations with this tip require no auxiliary conduit with air under pressure such as is necessary with conventional forms of underwater cutting torches. It should also be noted that the tip construction described herein specifies that the tip be of brass and the sleeve of copper alloy. This feature minimizes the possibility of fusion of the sleeve to the tip. The spacer ring 35 may also be made of brass.

The described tip construction permits rapid torch conversion for utilizing the advantages of oxygen-acetylene cutting or the advantages of oxygen-butane or oxygen-propane cutting, whichever is more important on a particular job. Acetylene gas is considerably more expensive than the equivalent amount of butane or propane gases. While the oxygen-butane cutting torch does not start a cut quite as quickly as an oxygen-acetylene operated torch, considerable savings in gas costs are made by conversion to oxygen-butane operation on work where the number of cuts to be started is not large. The oxygen-butane operated torch is cooler to handle, produces cleaner cuts with less slag, does not irritate the operator's nostrils with soot, and requires much less frequent changing to new gas supply tanks. The tip construction disclosed herein permits the flame to idle, and also permits the flame to be adjusted for silver soldering, regular soldering, and gas welding.

Obviously, variations in the nature and arrangement of the specific elements illustrated and described will be readily apparent to those skilled in the cutting torch art, and this invention contemplates any such equivalent structures within the scope of the following claims.

What is claimed is:

1. A cutting torch construction convertible to enable the burning of high or low grade gaseous fuel comprising in combination: a tip member having a central longitudinal passage for oxygen and having a concentric series of passages for combustible gases surrounding said central passage, an intermediate portion of the length of said tip member being tapered longitudinally, said tapered portion having a concentric series of grooves in the surface thereof extending forward from said combustible gas passages, the forward portion of said tip member being cylindrical and having a concentric series of grooves in the surface thereof extending forward from said grooves in said tapered portion; a sleeve member having a central longitudinal bore to receive and enclose said tapered and cylindrical portions of said tip member, an intermediate portion of said bore being tapered, said tapered portion having the same degree of taper and the same length as the tapered portion of said tip member, the forward portion of said bore being cylindrical and engaging the forward portion of said tip member; means for removably securing said tip and sleeve member in longitudinally adjustable concentrically assembled relation, said means including mating screw threaded portions on said tip and sleeve and a shoulder rearward of the threaded portion of said tip to limit the rearward longitudinal positions of said sleeve relative to said tip by an amount corresponding to concentric engagement of the tapered portions of said members, a spacing means arranged concentrically about said tip, abutting on said shoulder, and against which the rearmost portion of said sleeve is caused to abut in assembled relation, thus effecting radial spacing of the tapered portions of said tip and sleeve members forming a mixing chamber, said spacing means being removable from the assembly to permit the rear portion of said sleeve to abut on said shoulder and thus close the grooves on the tapered portion of said tip.

2. The combination defined in claim 1 in which the spacing dimension of said spacing means is equal to or less than the length of the forward cylindrical portion of said tip member.

References Cited in the file of this patent

UNITED STATES PATENTS

| | | |
|---|---|---|
| 943,385 | Bullock | Dec. 14, 1909 |
| 1,300,106 | Armstrong | Apr. 8, 1919 |
| 2,531,006 | Smith | Nov. 21, 1950 |